UNITED STATES PATENT OFFICE.

WALTER O. SNELLING, OF ALLENTOWN, PENNSYLVANIA, ASSIGNOR TO TROJAN POWDER COMPANY, OF ALLENTOWN, PENNSYLVANIA, A CORPORATION OF NEW YORK.

FERTILIZING-EXPLOSIVE.

1,316,396.     Specification of Letters Patent.     Patented Sept. 16, 1919.

No Drawing.     Application filed April 21, 1919. Serial No. 291,671.

*To all whom it may concern:*

Be it known that I, WALTER O. SNELLING, a citizen of the United States, and resident of Allentown, Lehigh county, Pennsylvania, have invented certain Improvements in Fertilizing-Explosives, of which the following is a specification.

My invention relates to fertilizing explosives of the type described in United States Patent No. 1,274,343, the object of my present invention being to provide a fertilizing explosive by means of which fertilizing material may be distributed through the soil in condition insuring maximum utilization of the fertilizing elements by the plant rootlets.

In order that plant rootlets may be able to make maximum utilization of fertilizing materials, it is very desirable that the fertilizing materials shall be present in finely divided form. The root hairs are able to take up fertilizing materials in proportion to the surface of the fertilizing material exposed to their action, and as is well known, the surface of any given mass of any material increases greatly as the size of the particles becomes smaller.

It is evident then, that maximum utilization of a fertilizing material would be achieved if the fertilizing material were present in pulverulent form. If the attempt is made to make up an explosive fertilizer however, with the fertilizing material present in pulverulent form, it will be found that the action of the pulverulent fertilizer distributed through the explosive is to decrease considerably the sensitiveness of the explosives. Every pulverulent body distributed through a mass of explosive material in any considerable proportion appears to have this property of decreasing sensitiveness, and with the large amount of fertilizing material which is desirable in a fertilizing explosive of the type involved, the desensitizing action of the pulverulent fertilizing material may be so great as to impart to the resulting explosive undesirable insensitiveness.

I have found that with many fertilizing materials of a brittle nature the difficulty may be obviated by utilizing the constituent in granular form, or even in coarse lumps, the pulverizing and disintegrating effect at the moment of the explosion being sufficient to reduce the fertilizing material to a very finely pulverulent condition.

There are some fertilizing materials, however, which are of so hard and tough a nature as to be insufficiently powdered or disintegrated by the explosive at the moment of detonation. If these materials are used in granular condition there occurs insufficient pulverization to give the required amount of surface for the desired fertilizing action, while on the other hand if the fertilizing constituent is pulverized and then added to the explosive, too great insensitiveness is produced in the resulting mixture.

My present invention relates to a means for completely obviating the described difficulty. I have discovered that by first pulverizing in any ordinary mill my fertilizing ingredient or ingredients, and then agglutinating or cementing the powder so produced, using a weak cementing medium so as to obtain easily friable lumps, I can obtain lumps of fertilizer which, when added to my explosive, will not materially reduce its sensitiveness, but will still at the moment of explosion be properly broken up into a very fine powder.

As an example of my invention, I may take "land pebble" or hard phosphate rock, and first grind it in any suitable mill to a desired degree of fineness, which is preferably to such degree of fineness that the whole of the material will pass through a sieve having openings approximately .14 mm. square. I next add to the powder so produced one or two per cent. of a suitable cementing agent or binder. There are many materials which are suitable as a cementing agent, a 2% solution of gum acacia being satisfactory, or a 2% solution of ordinary glue, and in fact any cementing agent affording low binding power. I add sufficient cementing agent to my finely pulverized fertilizing constituent to make a thick paste, and I then allow this paste to harden, either before or after forming it into grains or granules of the desired size, by molding or granulating the mixture while wet, or by allowing the mixture to harden and then crushing it to the proper size.

The granules of fertilizing material so produced are easily friable, and completely break up into powder at the moment of detonation of the explosive. The granules however, have no effect upon the sensitiveness of the explosive, and their disintegration to powder appears to take place only after the explosive wave has already passed through the column of explosive.

Although I have illustrated the application of my invention in connection with the use of rock phosphate, it is evident that my invention should not properly be limited to this or any other specific constituent. I may use feldspar or alunite as sources of potash, apatite as a source of phosphorous I may use any tough material which contains a fertilizing ingredient, first pulverizing the same, and then producing easily friable lumps from the powder, by agglutinating it with a cement of low binding power. As also mentioned, I may use any friable or easily pulverized fertilizing ingredient without such preliminary pulverization, in conjunction with granules made as prescribed, from tougher or less readily pulverized materials.

I claim:

1. A fertilizing explosive comprising explosive material in association with friable granules of fertilizing material.

2. A fertilizing explosive containing pulverulent fertilizing material and a binder.

3. A fertilizing explosive containing small masses of finely divided fertilizing material held together by an agglutinant.

4. A fertilizing explosive comprising, in association with explosive material, small masses of pulverized fertilizing material held together by a cement of low binding power.

5. The process of producing a fertilizing explosive comprising forming fertilizing material into friable granules and associating said granules with explosive material.

6. The process of producing a fertilizing explosive comprising pulverizing fertilizing material, forming said pulverized material into friable granules, and associating said granules with explosive material.

7. The process of producing a fertilizing explosive comprising pulverizing fertilizing material, adding cementing material to said pulverized fertilizer, granulating said mixture, and associating said granules with explosive material.

8. The process of producing a fertilizing explosive comprising pulverizing fertilizing material, agglutinating said pulverized material with a cementing medium of low binding power, forming said agglutinated material into lumps, and associating said lumps with an explosive material.

In witness whereof I affix my signature.

WALTER O. SNELLING.